United States Patent
Yamada et al.

(10) Patent No.: US 6,814,446 B2
(45) Date of Patent: Nov. 9, 2004

(54) REAR PROJECTOR

(75) Inventors: Haruyoshi Yamada, Shiojiri (JP); Jun Arai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/370,612

(22) Filed: Feb. 24, 2003

(65) Prior Publication Data

US 2003/0189694 A1 Oct. 9, 2003

(30) Foreign Application Priority Data

Mar. 13, 2002 (JP) ........................................ 2002-069339
Dec. 17, 2002 (JP) ........................................ 2002-365029

(51) Int. Cl.[7] ........................ G03B 21/16; G03B 21/18; G03B 21/14; G03B 21/22; H04N 5/74
(52) U.S. Cl. ........................... 353/60; 353/61; 353/119; 348/748
(58) Field of Search ............................. 353/57, 58, 60, 353/61, 52, 119; 348/748, 836, 778, 843, 789, 794

(56) References Cited

U.S. PATENT DOCUMENTS

| | | | | |
|---|---|---|---|---|
| 5,808,704 A | * | 9/1998 | Yoshikawa et al. | 348/748 |
| 6,040,877 A | * | 3/2000 | Won | 348/748 |
| 6,443,575 B1 | * | 9/2002 | Miyamoto et al. | 353/58 |
| 6,450,646 B1 | * | 9/2002 | Ono et al. | 353/57 |
| 6,533,421 B2 | * | 3/2003 | Ono | 353/61 |
| 6,565,214 B1 | * | 5/2003 | Shinobu | 353/74 |
| 6,618,213 B2 | * | 9/2003 | Inamoto | 359/889 |

FOREIGN PATENT DOCUMENTS

| | | |
|---|---|---|
| JP | H08-304739 A | 11/1996 |
| JP | H09-98360 A | 4/1997 |
| JP | 2001-343708 A | 12/2001 |

* cited by examiner

Primary Examiner—Christopher E Mahoney
(74) Attorney, Agent, or Firm—Oliff & Berridge, PLC

(57) ABSTRACT

An intake opening (132L) is formed on a left lateral side (132) of a lower cabinet (13) and an exhaust opening (132R) is formed on a right lateral side (132) in a rear projector (1), where a cooling air introduced from the intake opening (132L) by a plurality of fans provided in the lower cabinet (13) flows along a front side of a screen to cool the interior of the projector to be finally discharged from the exhaust opening (132R), so that the air after cooling the interior which is discharged by the exhaust opening (132R) is prevented from entering into the intake opening (132L), thereby always introducing fresh cooling air to cool the interior efficiently.

11 Claims, 14 Drawing Sheets

REAR PROJECTOR

BACKGROUND OF THE INVENTION

1. Field of the Invention

The present invention relates to a rear projector including an image generator that has an optical device for modulating a light beam irradiated by a light source in accordance with image information to form an optical image and a projection optical system for enlarging and projecting the optical image, a box-shaped casing for accommodating the image generator, and a screen exposed on one of the sides of the box-shaped casing onto which the optical image generated by the image generator is projected.

2. Description of Related Art

Recently, a rear projector has come to be used in the field of home theater etc. Such rear projector has an image generator for generating a projection image, a box-shaped casing accommodating the image generator and a reflection mirror for reflecting the projected image and a transmissive screen exposed to a side of the box-shaped casing.

The image generator has a light source lamp, an optical device such as a liquid crystal panel for modulating a light beam irradiated by the light source lamp in accordance with image information, and a projection optical system such as a projection lens for enlarging and projecting the generated optical image.

The optical image generated by the image generator is reflected on a mirror etc. to be projected on the transmissive screen, which transmits through the screen to be viewed as an image.

Such rear projector also accommodates acoustic device such as a speaker inside the casing thereof, so that the large-screen image has much presence with the use of the acoustic device.

Incidentally, the image generator of such rear projector has the light source lamp, a light source driving block for driving the light source lamp, and a power source block for supplying electric power to the board for controlling the drive of the optical device, all of which are heat source. On the other hand, some of the components of the optical device etc. are weak against heat. Accordingly, it is important to cool the interior of the projector efficiently.

Conventionally, the interior of the projector is conducted according to the following arrangements.

In an arrangement shown in Japanese Patent Laid-Open Publication No. 2001-343708, an intake opening and an exhaust opening are provided on a front side, i.e. on a side provided with a screen, of the casing of a rear projector, through which the cooling air is introduced to the interior of the projector and is exhausted therefrom (see FIG. 6 thereof).

In another arrangement shown in Japanese Patent Laid-Open Publication No. Hie 9-98360, an intake opening is provided on a front side of the casing of a rear projector and an exhaust opening is provided on a rear side of the casing of the rear projector, where the interior of the projector is cooled by a cooling channel from the front side to the rear side of the rear projector (see FIG. 9).

However, according to the cooling method shown in Japanese Patent Laid-Open Publication No. 2001-343708, since both of the intake opening and the exhaust opening are provided on the front side of the casing, a part of the air having cooled the interior of the projector and exhausted from the exhaust opening is taken in by the intake opening, thus raising the temperature of the cooling air introduced from the intake opening and the interior of the projector cannot be efficiently cooled.

Further, since the heated air having cooled the interior of the projector is exhausted from the front side of the casing, the spectator may feel unpleasantness according to the amount of the discharged air.

Since the exhaust opening is provided on the rear side of the casing in the cooling method shown in Japanese Patent Laid-Open Publication No. Hie 9-98360, when the rear projector is installed, for example, with the rear side thereof being opposed to a room wall, the flow of the cooling air is blocked by the wall, so that the heat may remain interior the projector and the interior of the projector cannot be efficiently cooled.

SUMMARY OF THE INVENTION

An object of the present invention is to provide a rear projector capable of efficiently cooling the interior of the projector and giving no unpleasant feeling to the spectators.

A rear projector according to an aspect of the present invention comprises: an image generator having an optical device that modulates a light beam irradiated by a light source in accordance with image information to form an optical image and a projection optical system that enlarges and projects the optical image; a box-shaped casing that accommodates the image generator; and a screen exposed on any one of lateral sides of the box-shaped casing that on which the optical image formed by the image generator is projected, in which an intake opening that introduces a cooling air to the image generator is formed on a first lateral side of the casing adjacent to a first edge of the screen other than the lateral side provided with the screen and an exhaust opening that discharges the air after cooling the image generator is formed on a second lateral side of the casing adjacent to a second edge of the screen opposite to the first edge of the screen, and in which a cooling channel for the cooling air to be flowed is formed inside the casing along the surface of the screen.

The optical device as a component of the image generator includes various optical modulators capable of optically modulating the light beam irradiated by the light source in accordance with image information, which may modulate the color image with a single plate or, alternatively, may combine a plurality of color lights of R, G and B by a color combining optical device such as a prism to form a color image after modulating the color lights with a plurality of optical modulators. The optical modulator includes a micro-mirror as well as transmissive liquid crystal panel and reflective liquid crystal panel.

The shape of the screen is not restricted, but may be designed in any manner such as rectangle and trapezoid.

According to the above arrangement, since the intake opening and exhaust opening are separately formed on the lateral sides other than the side provided with the screen adjacently to the opposing edges of the screen, the air having cooled the interior of the projector discharged from the exhaust opening can be securely prevented from entering into the intake opening. Accordingly, the temperature of the air introduced from the intake opening is always approximately the same as room temperature, thereby efficiently cooling the interior of the casing.

Further, when the rear projector is installed with backside thereof facing, for instance, a wall of a room, the flow of the cooling air is not hindered by the wall, thereby efficiently cooling the interior of the projector.

Since the air having cooled the interior of the projector is discharged from the lateral side of the casing provided with no screen, the air having cooled the interior of the projector is not discharged from the front side of the casing, thus causing no unpleasant feeling on spectators. Further, blur of image on the screen caused when the temperature of the discharged air is high can be prevented.

In the above rear projector, a first duct that guides at least a part of the cooling air in normal line direction of the surface of the screen may preferably be provided in the cooling channel.

The first duct may preferably have a tube-shaped body having an introduction hole that introduces at least a part of the cooling air at a side adjacent to a first end thereof and a discharge hole for discharging the introduced cooling air at a side adjacent to a second end opposite to the first end. Incidentally, the cross section of the first duct may be designed in any manner such as cylindrical shape and square pillar in accordance with layout of the interior of the projector and the component to be cooled as long as the cooling air can be efficiently flowed.

According to the above arrangement, when it is preferable to form a cooling channel in a normal line direction of the screen surface according to layout of the components of the image generator, the cooling air can be guided in the normal line direction by the first duct, thus further efficiently cooling the interior of the projector.

Further, since the introduction hole and the discharge hole of the first duct are formed as described above, the air flowing along the screen surface can be taken in at the introduction hole and can be discharged from the discharge hole again in a direction along the screen surface, the entire flow of the cooling channel inside the projector is not impaired, thus efficiently cooling the interior of the projector.

In the above-described rear projector, the first duct may preferably form a channel for cooling the light source and may preferably be directly connected to the exhaust opening.

Since the first duct forms the channel for cooling the light source and is directly connected to the exhaust opening, the air with the highest temperature after cooling the light source is directly discharged from the exhaust opening, so that the air having cooled the light source is not fed to the other part of the image generator, thus enhancing cooling efficiency.

In the above-described rear projector, the image generator may preferably have a first power source block that supplies electric power to a controller that controls the drive of the optical device, a sound signal amplifier that amplifies a sound signal annexed to the image information and a second power source block that supplies electric power to the sound signal amplifier, and a partition that divides a cooling channel of the first power source block from a cooling channel of the sound signal amplifier and the second power source block may preferably be provided in the cooling channel.

According to the above arrangement, the air flowing through both cooling channels can be divided by the partition. The temperature of the air after cooling the first power source block is relatively low and can be used for cooling the sound signal amplifier and the second power source block. Accordingly, the components of the image generator can be cooled without loss, thus enhancing the cooling efficiency.

The above rear projector may preferably have a leg provided on the lower side of the casing that supports a body of the projector, in which a second duct that introduces a part of the cooling air to the lower side of the projector is provided to the intake opening, and in which an optical device cooling channel connected to the second duct to guide the cooling air to the optical device is formed on the lower side of the casing and the leg.

The leg may preferably comprise a receiver surface abutted to the entire lower side of the casing, an external rib surrounding the outer circumference of the receiver surface so that the casing is fitted, a support formed on the opposite side of the external rib to surround the opposite side of the receiver surface and a leg body including a matrix-shaped reinforcing rib formed within the support.

The optical device cooling channel can be formed by covering a concave groove formed on a part of the receiver surface with the lower side of the casing.

According to the above arrangement, since the cooling air introduced from the intake opening is directly supplied to the optical device by the optical device cooling channel, the cooling air of low temperature can be introduced to the optical device to enhance the cooling efficiency of the optical device.

Since the optical device cooling channel is provided between the lower side of the casing and the leg, the layout of the image generator is not restricted, thus enhancing the freedom of design.

Further, since the optical device cooling channel can be formed only by providing the concave groove on the receiver surface of the leg, thereby simplifying the structure.

A fan that cools the first power source block may preferably be provided adjacent to the first power source block and a fan that cools the light source may preferably be provided adjacent to the light source, the fans sharing the cooling air introduced from the intake opening to form two cooling channels.

According to the above arrangement, since the air introduced from the intake opening is divided to the channel for cooling the light source and the cooling channel for the two power source blocks, the hot air after cooling the light source does not affect on the two power source blocks, thus efficiently cooling the light source and the power source block.

In the above rear projector, the casing may preferably have a first casing that accommodates the image generator and a second casing provided with the screen, and the dimension of the first casing along the screen surface may preferably be smaller than the dimension of the second casing along the screen surface.

According to the above arrangement, even when the rear projector is installed closely adjacent to wall of a corner of a room etc., the cooling air can be flowed in the direction of both lateral sides of the first casing through the space on the side of the first casing formed by the dimension difference of the vertically disposed second casing and the first casing, thereby efficiently utilizing the space of a room etc.

In the above rear projector, the intake opening may preferably have at least two intake systems that introduce the cooling air into the interior of the casing, and the exhaust opening may preferably have at least two exhaust systems that discharge the air after cooling the interior of the casing.

According to the above arrangement, since more than one intake system and exhaust system are provided, the components can be cooled in more local manner, thus enhancing entire cooling efficiency. Further, since two or more cooling channels are provided, hot component and a part not so hot but required to be cooled can be cooled with separate cooling systems, thus enhancing cooling efficiency.

In the above, a dust filter may preferably be provided at least one of the intake systems.

According to the above arrangement, the invasion of dust into the interior of the casing can be prevented by the dust filter such as an air filter, thus preventing malfunction of the image generator and improving the quality of the projected image.

In the above rear projector, the screen may preferably be formed in a rectangle.

According to the above arrangement, since the screen is formed in a rectangle, the intake opening and the exhaust opening formed on respective sides of the casing adjacent to the opposing edges of the screen can be located in an opposing manner. Accordingly, the cooling air can be flowed substantially in one direction from the intake opening to the exhaust opening, so that the hot air can be kept from staying inside the rear projector and cooling efficiency can be enhanced.

DETAILED DESCRIPTION OF PREFERRED EMBODIMENT(S)

An embodiment of the present invention will be described below with reference to attached drawings.

1. Primary Arrangement of Rear Projector

Figure 1:
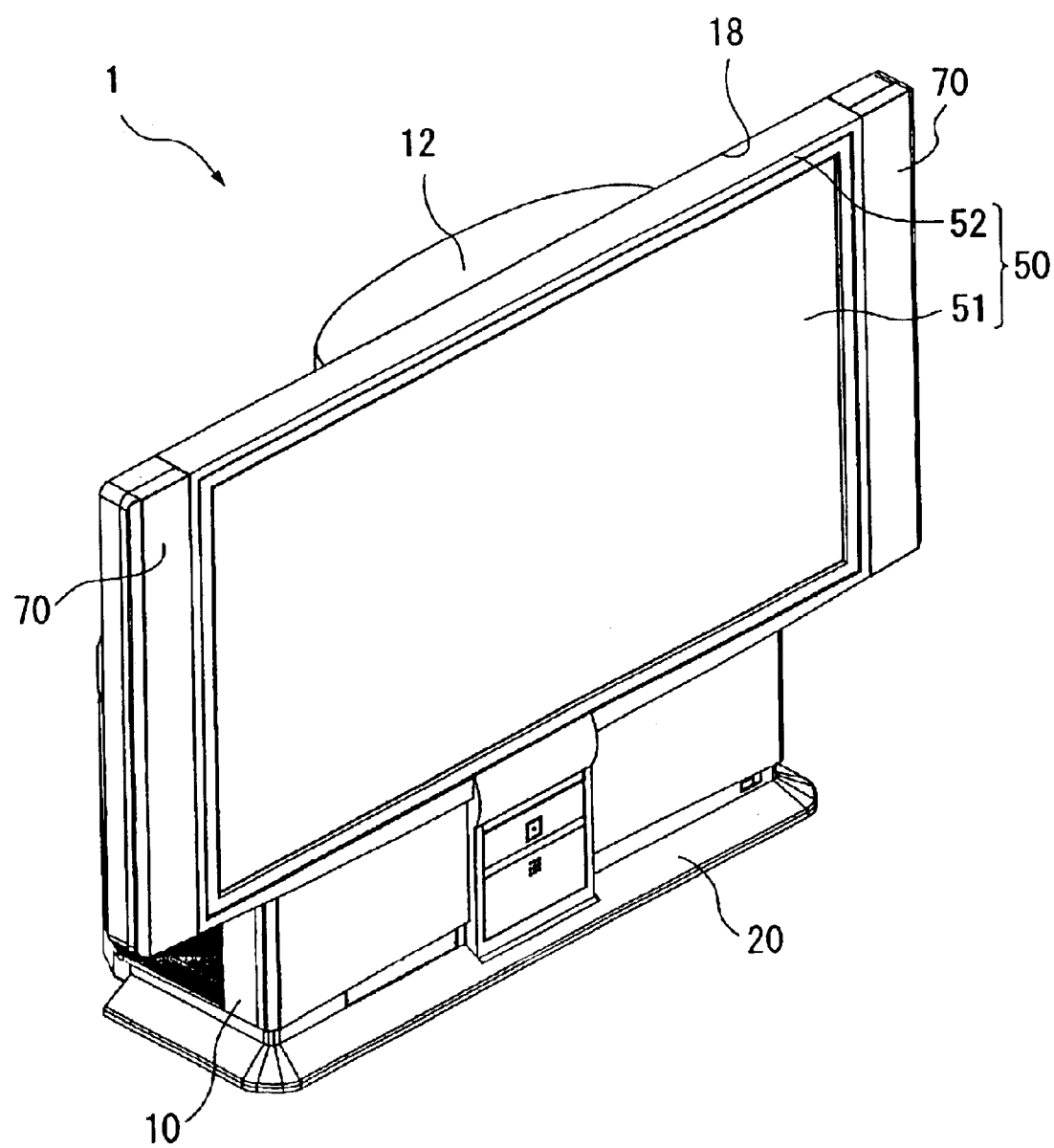
FIG. 1 is a perspective view of a rear projector seen from front side according to the present invention.
Figure 2:
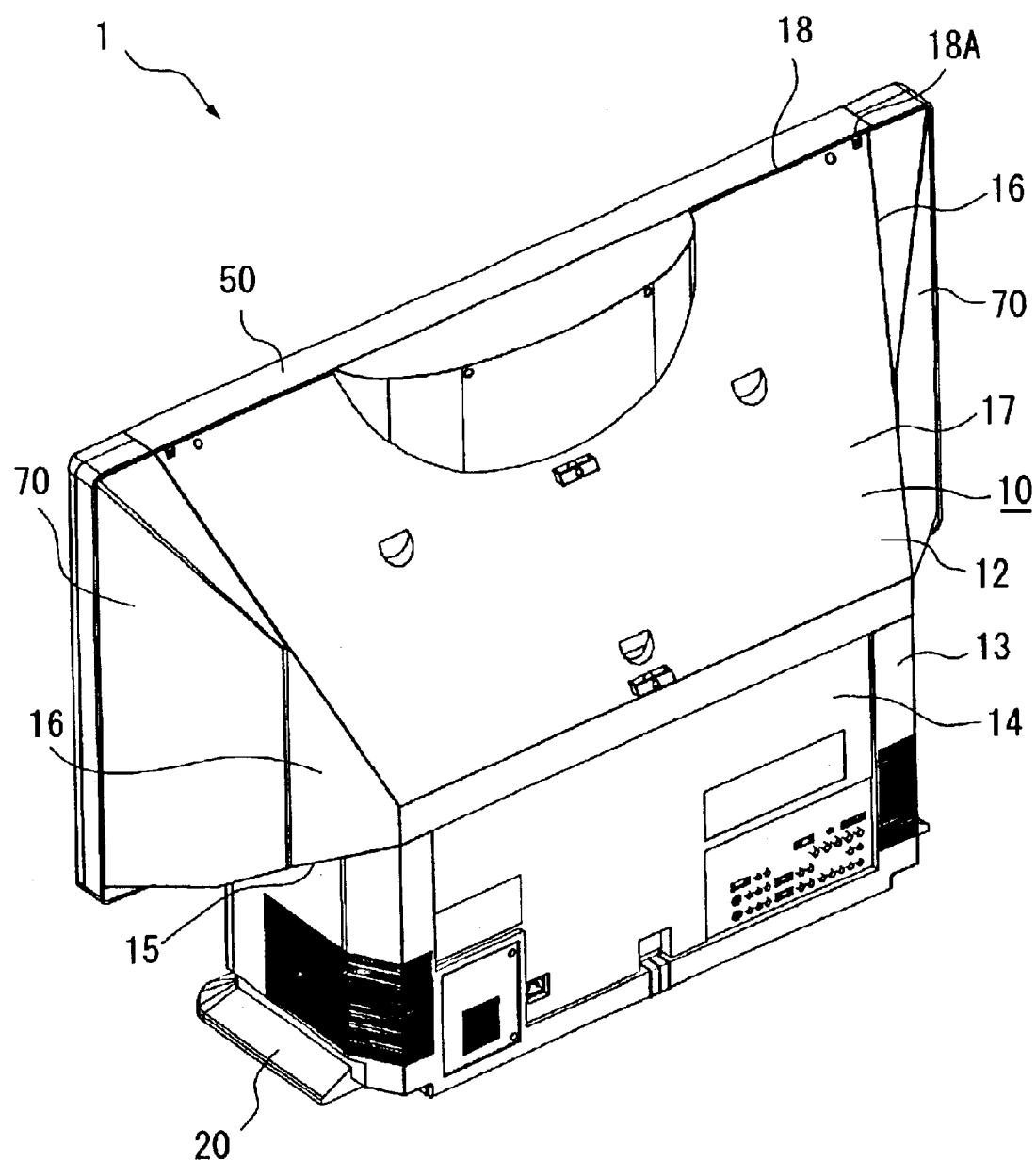
FIG. 2 is a perspective view of the rear projector seen from rear side.
Figure 3:
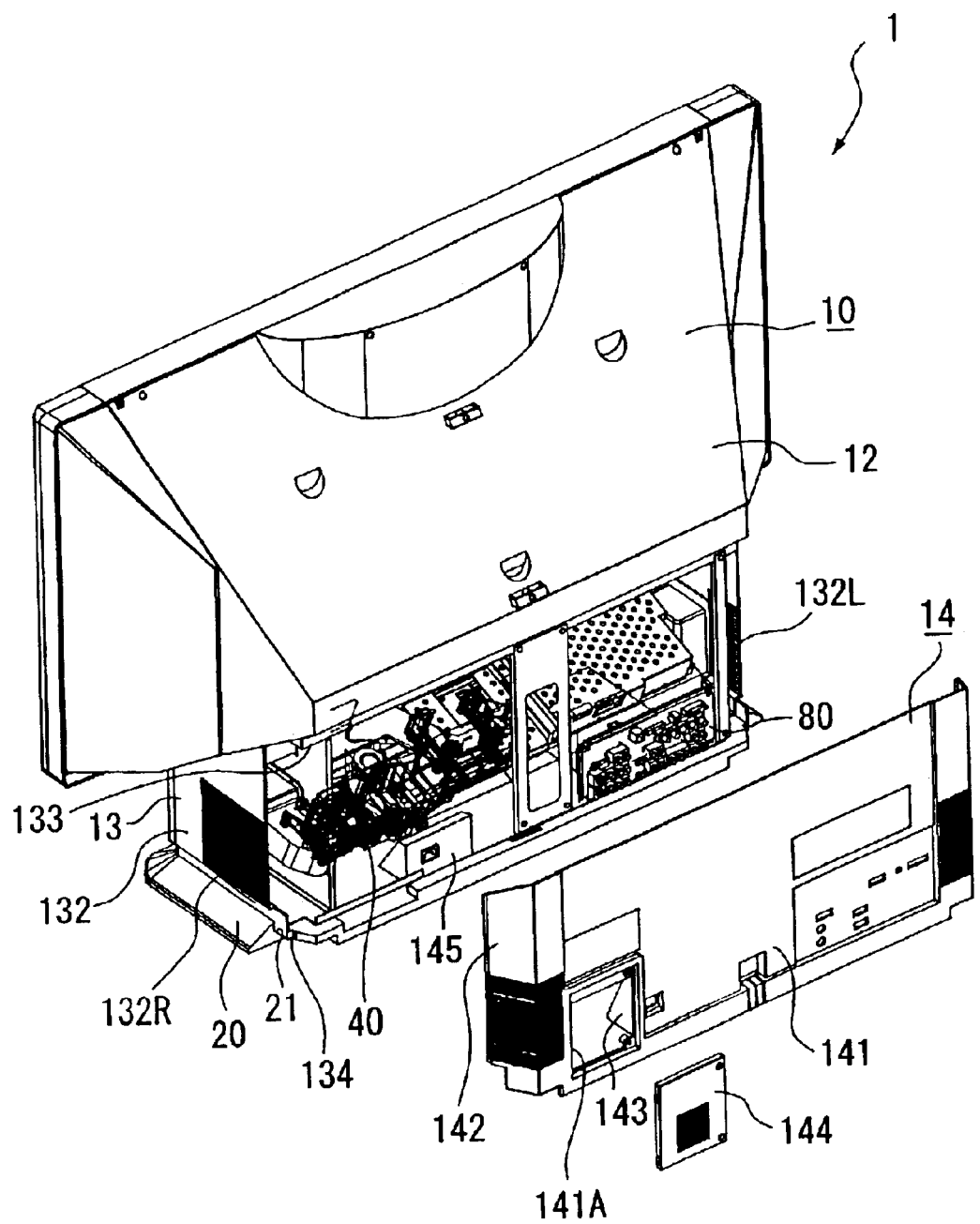
FIG. 3 is an exploded perspective view of the rear projector seen from rear side, which specifically shows that a back cover is removed from FIG. 2.
Figure 4:
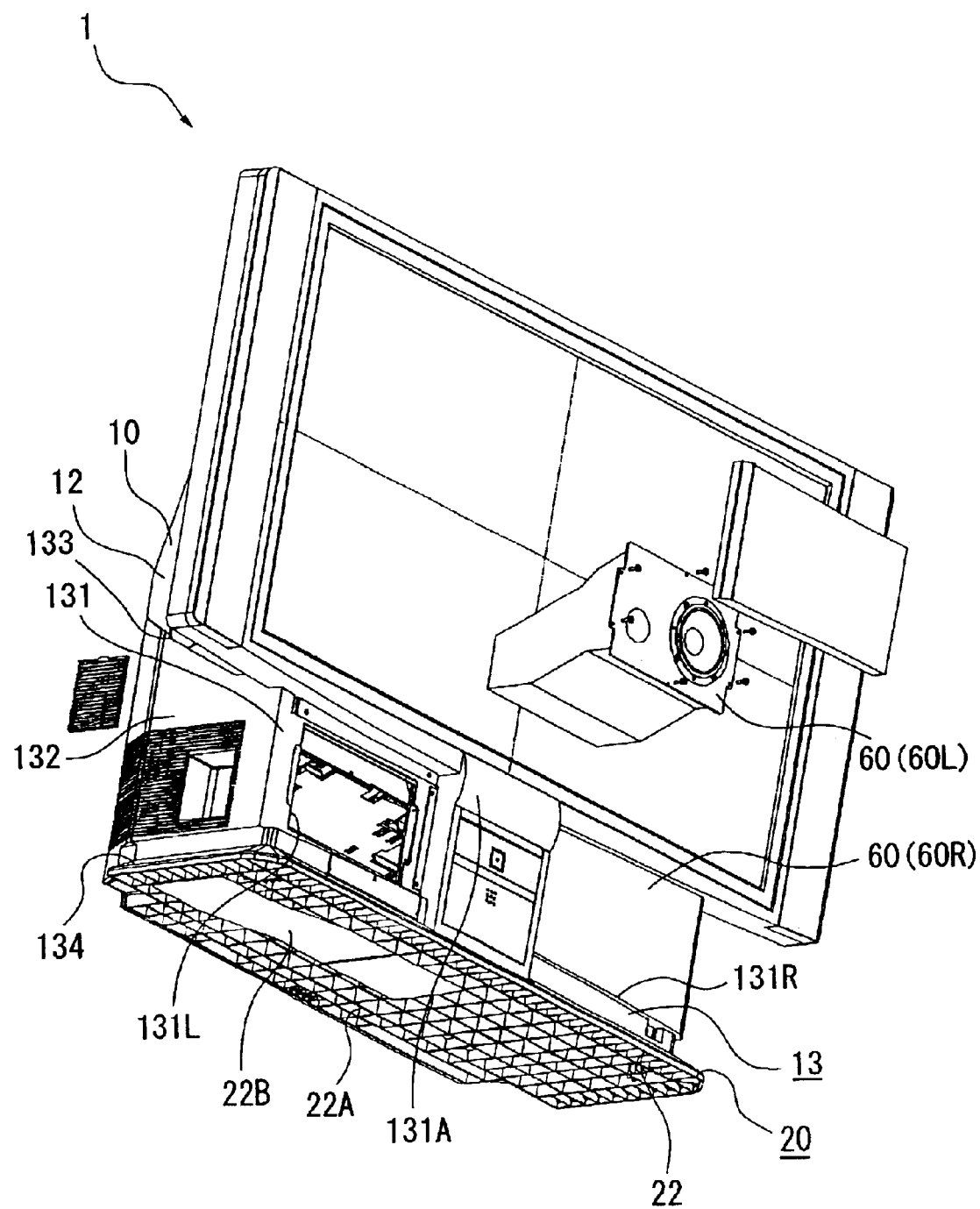
FIG. 4 is an exploded perspective view of the rear projector seen from bottom side.
Figure 5:
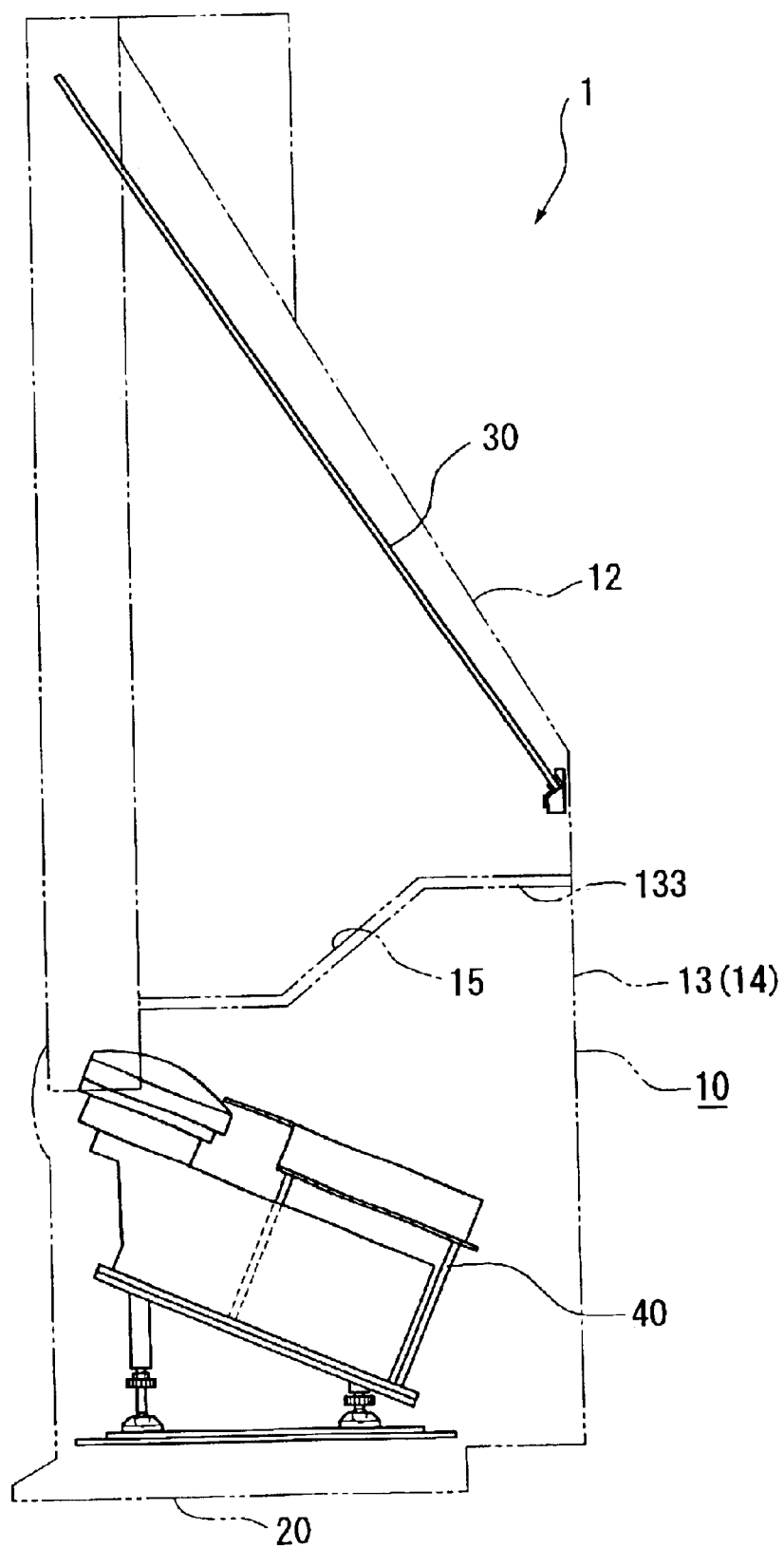
FIG. 5 is a vertical cross section of the rear projector.

FIG. 1 is a perspective view seen from front side of a rear projector 1 according to an aspect of the present invention. FIG. 2 is a perspective view of the rear projector 1 seen from rear side thereof. FIG. 3 is an exploded perspective view of the rear projector 1 seen from rear side, which specifically shows the rear projector 1 with a back cover 14 being removed from FIG. 2. FIG. 4 is an exploded perspective view of the rear projector 1 seen from lower side. FIG. 5 is a vertical cross section showing the rear projector 1.

A primary arrangement of the rear projector 1 will be described below with reference to FIGS. 1 to 5.

As shown in FIGS. 1 to 5, the rear projector 1 modulates a light beam irradiated by a light source in accordance with image information to form an optical image, and enlarges and projects the optical image on a screen, which includes a cabinet 10 constituting a casing, a leg 20 provided on the lower side of the cabinet 10, an interior unit 40 as an image generator located inside the cabinet 10, a reflection mirror 30 also located inside the cabinet 10, and a screen unit 50 exposed on a side of the cabinet 10. The cabinet 10, the interior unit 40, the reflection mirror 30 and the screen unit 50 construct a projector body.

Incidentally, for the convenience of explanation, left side seen from front side is referred to as left and right side seen from front side is referred to as right in the present embodiment.

The cabinet 10 is a casing of synthetic resin for accommodating the interior unit 40 and the reflection mirror 30. As shown in FIGS. 2 and 3, the cabinet 10 accommodates the interior unit 40 and has a lower cabinet 13 of C-shaped vertical cross section as a first casing covering approximately entire front, upper and lower sides and right and left sides, a back cover 14 covering the rear side and a part of the right and left sides, and an upper cabinet 12 of triangle vertical cross section as a second casing disposed on the upper side of the lower cabinet 13.

The dimension of the lower cabinet 13 in right and left direction along the surface of the screen unit 50 is smaller than the dimension of the upper cabinet 12 in right and left direction along the surface of the screen unit 50.

The back cover 14 is detachably attached to the lower cabinet 13.

As shown in FIG. 4, the lower cabinet 13 includes a front side 131, right and left lateral sides 132, an upper side 133 and a lower side 134.

A central portion 131A bulging toward front side in accordance with projection of a projection lens constituting the interior unit 40 is provided approximately at the center of the front side 131. Rectangular openings 131R and 131L of approximately the same dimension are formed on both sides of the central portion 131A. Woofer boxes 60 (60R and 60L) as a speaker for reproducing low-pitched sound are respectively attached to the openings 131R and 131L. The woofer boxes 60R and 60L are attachable to and detachable from the openings 131R and 131L from the front side.

Incidentally, though not clearly shown in the illustration, various device-connecting terminals such as connector for connecting a computer, a video input terminal and audio-connection terminal are provided on the lower side of the left opening 131L.

Further, as shown in FIG. 3, slit-shaped openings are formed on the right and left lateral sides 132 of the lower cabinet 13. The left opening is an intake opening 132L for introducing a cooling air into the interior of the projector and the right opening is an exhaust opening 132R for discharging the air having introduced and cooled the interior.

The upper side 133 opposes to a lower side of the upper cabinet 12 (described below). The lower side 134 abuts to the receiver surface of the leg 20 (described below).

As shown in FIG. 3, the back cover 14 includes a rear side 141 and right and left lateral sides 142.

A second intake opening 141A for introducing cooling air is formed on the right side (left side seen from rear side) of the rear side 141 of the back cover 14. An air filter 143 as a dust filter is attached to the second intake opening 141A. A cover 144 for shutting the second intake opening 141A provided with the air filter 143 is detachably attached to the opening 141A. An opening for inlet connector 145 is provided on the left side (right side seen from rear side) of the second intake opening 141A of the rear side 141.

Various device connection terminals such as connector for connecting a computer, a video input terminal and audio-connection terminal are provided on the left side (right side seen from rear side) of the rear side 141 and an interface board 80 is provided on the inner surface of the rear side 141.

As shown in FIGS. 2 and 5, the upper cabinet 12 is a casing of triangle vertical cross section for accommodating the reflection mirror 30, which includes a lower side 15 of approximately rectangle plate, right and left lateral sides 16 of triangle plate vertically extending from both ends of the lower side 15, a rear side 17 spanning over the right and left sides and slanting toward the lower rear side, and a front side 18 of approximately rectangle plane. Rectangular opening 18A is formed on the planar front side 18. A screen unit 50 covering the opening 18A is attached to the front side 18.

Figure 6:
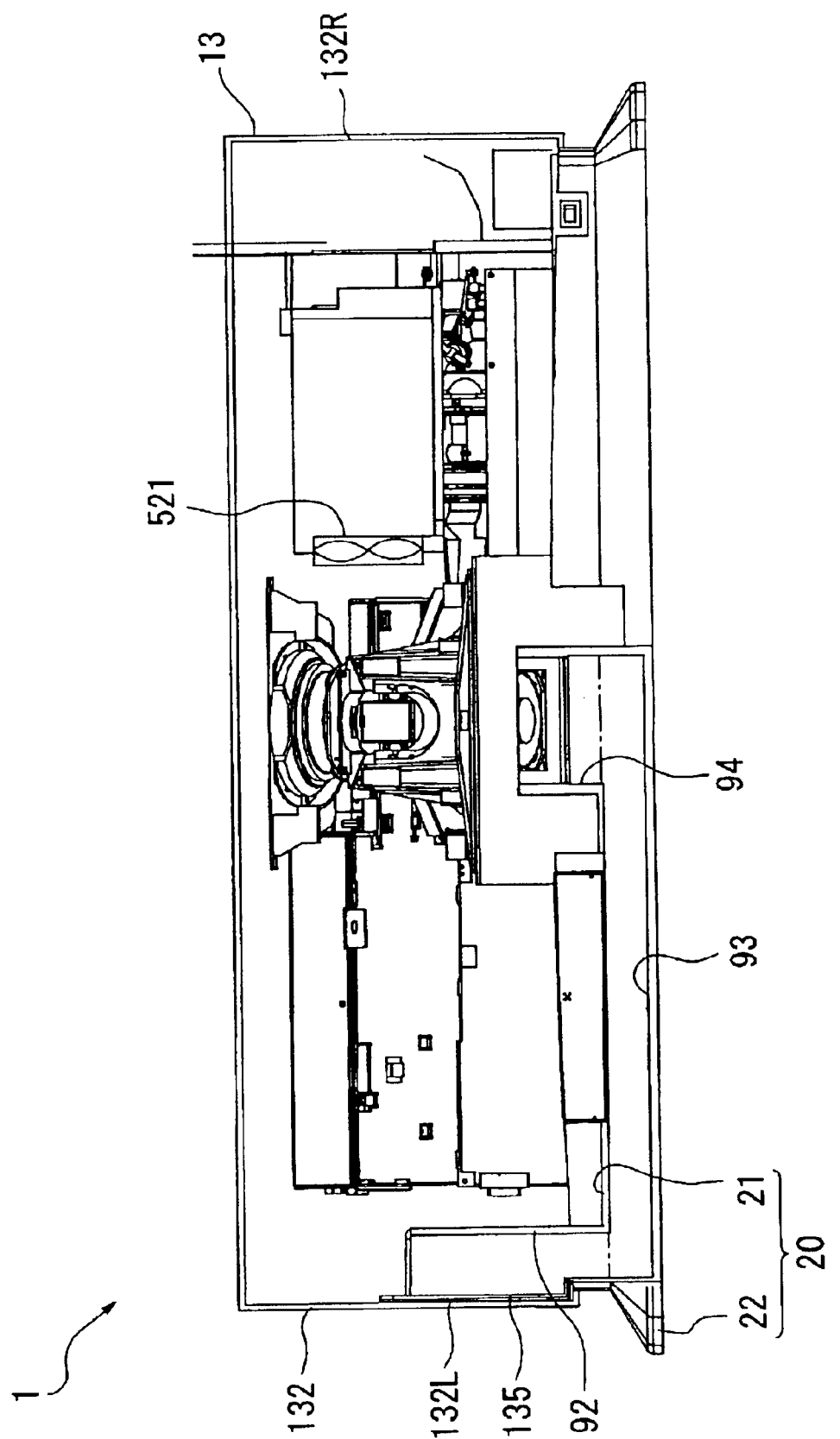
FIG. 6 is a vertical cross section of the rear projector seen from front side.

FIG. 6 is a vertical cross section of the lower cabinet 13 and the leg 20 of the rear projector 1 seen from front side.

As shown in FIGS. 3, 4 and 6, the leg 20 is a synthetic resin member supporting the projector body and covering a part of the front side 131 of the lower cabinet 13, which includes a receiver surface 21 to be abutted to the entire lower side 134 of the lower cabinet 13, and a rib-shaped support 22 surrounding the back side of the receiver surface 21 and having a predetermined height dimension.

A concave groove dented for a dimension corresponding to the height of the support 22 is formed on the receiver surface 21, the groove extending from the left side to the center of the central area in front and back direction.

As shown in FIG. 4, the backside of the support 22 abuts to a surface of floor etc. when the rear projector 1 is installed on a floor surface or upper surface of desk. A reinforcing rib 22A of matrix-shape having a predetermined height is formed on the inner circumference of the support 22. The reinforcing rib 22A enhances the rigidity of the leg 20 and prevents position shift from the floor surface etc.

A planar portion 22B having no reinforcing rib 22A is provided on a part of the inner area of the support 22, the planar portion 22B extending from the left to the center of central area in front and back direction on the backside of the support 22. The planar portion 22B is the lower side of the concave groove formed on the receiver surface 21.

As shown in FIG. 6, when the projector body is mounted on the receiver surface 21 having the concave groove, a third duct 93 extending from the left lateral side 132 of the lower cabinet 13 to the central portion in right and left direction is formed. However, the lower side of the projector body does not abut to both peripheral ends of the third duct 93 so that the peripheral end around the left lateral side 132 and the peripheral end at the approximate center are left open.

An end of a second duct 92 is connected to the opening adjacent to the left lateral side 132. The other end of the second duct 92 is connected to the intake opening 132L formed on the left lateral side 132 through an air filter 135 as a dust filter.

An end of fourth duct 94 is connected to an opening on the central peripheral end at the central portion. The other end of the fourth duct 94 is disposed on the lower side of an optical device constituting the projector body through an elastic member such as a sponge.

Figure 7:
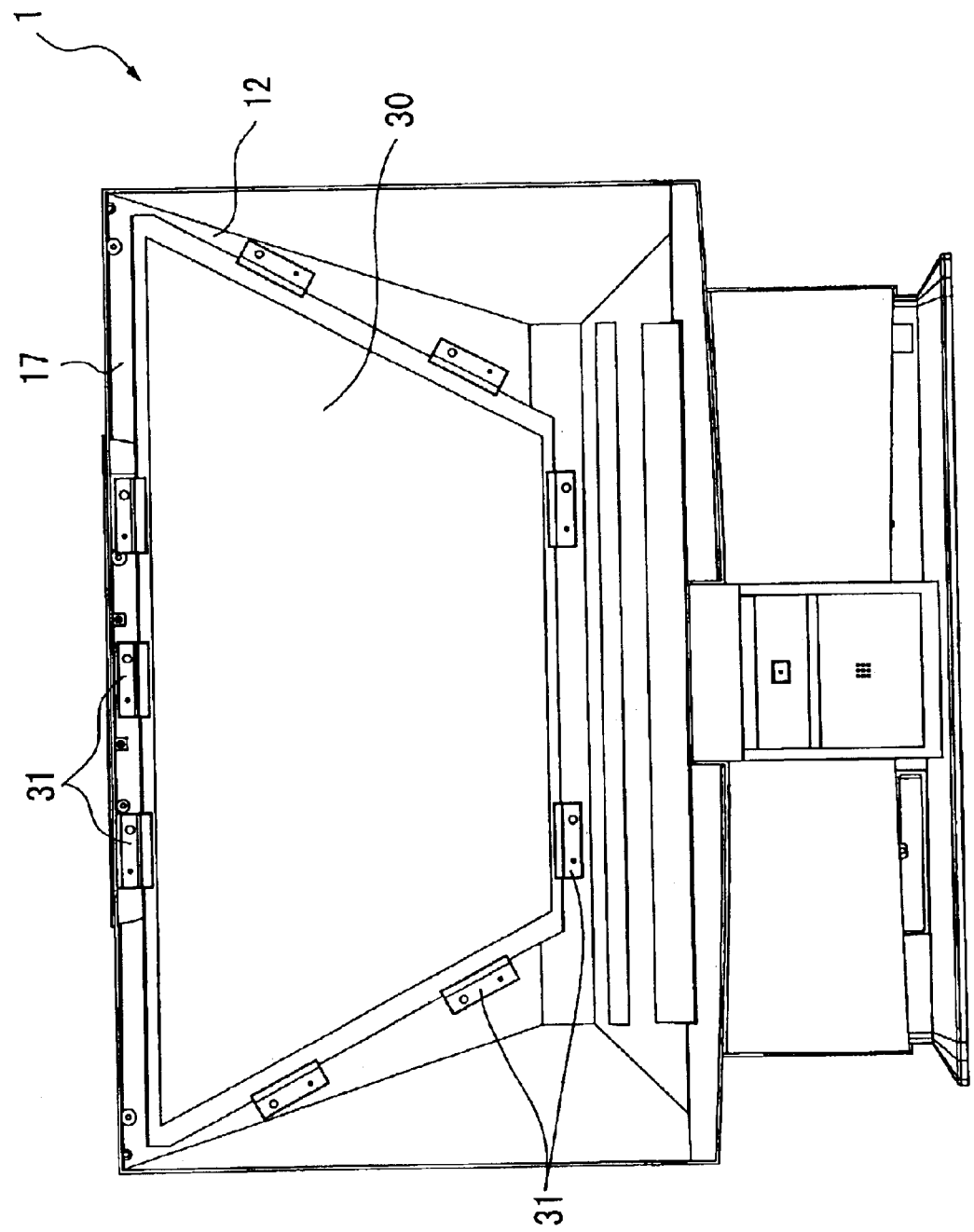
FIG. 7 is a front elevational view of the rear projector with a screen thereof being removed.

FIG. 7 is a front elevational view with the screen unit 50 being removed from the rear projector 1.

The reflection mirror 30 is an ordinary reflection mirror of approximate trapezoidal shape, which is attached to the inside of the rear side 17 of the upper cabinet 12 so that the long side of the trapezoid comes to the upper side. A mirror holder 31 for holding the reflection mirror 30 at a predetermined position is formed on an inner side of the rear side 17 of the upper cabinet 12. The mirror holder 31 holds the long side, short side and oblique sides of the reflection mirror 30 so that there is no distortion on the reflection mirror 30.

2. Structure of Interior Unit

Figure 8:
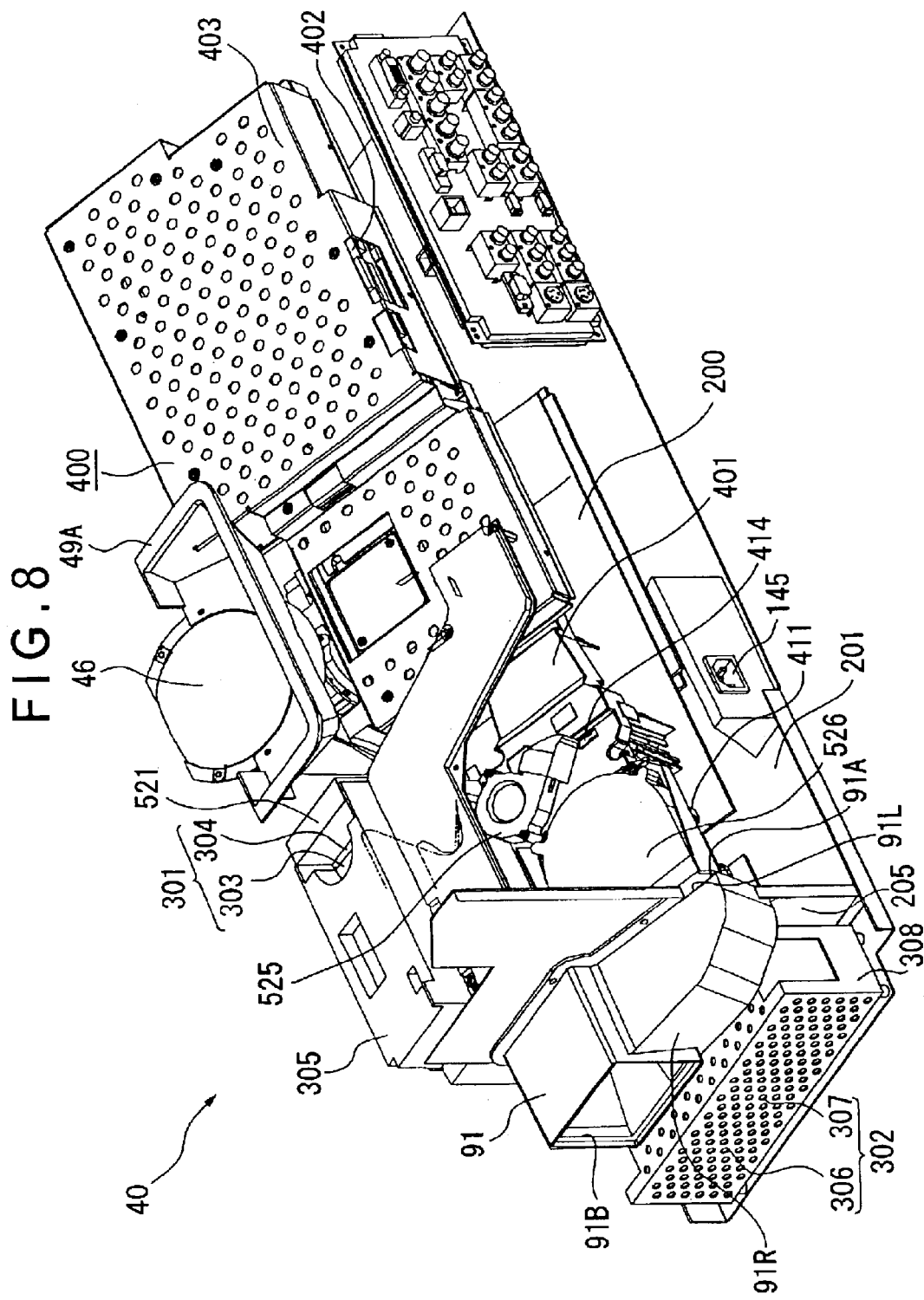
FIG. 8 is a perspective view of an interior unit constituting the rear projector seen from rear side.

FIG. 8 is a perspective view of the interior unit seen from rear side.

The interior unit 40 is a device for forming a predetermined optical image in accordance with inputted image information and outputting sound and image by amplifying the sound signal added to the image information. The interior unit 40 has an interior unit body 400, a support member 200 made of metal such as aluminum for supporting the interior unit body 400 at a predetermined attitude, a first power source 301, and a second power source 302.

Figure 9:
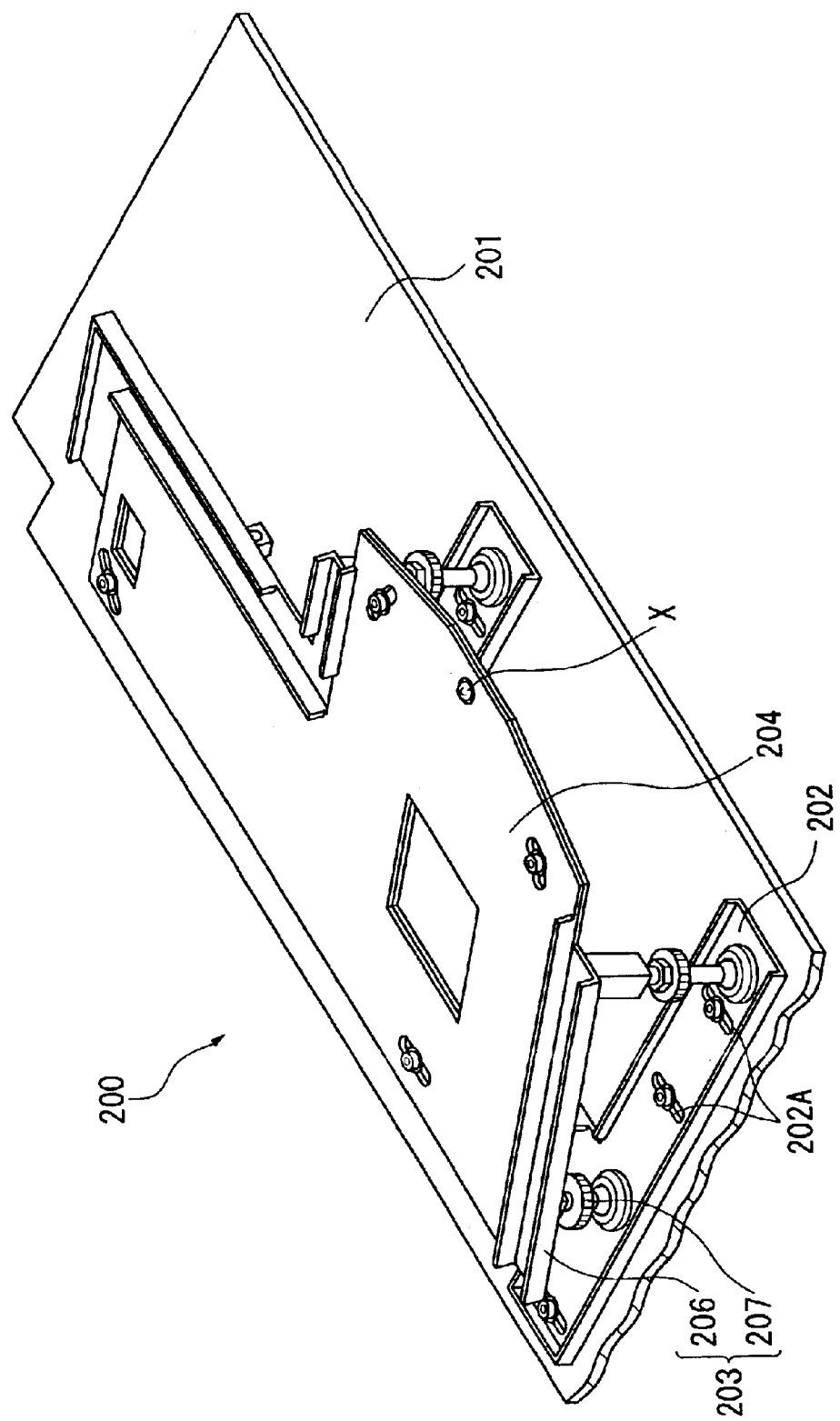
FIG. 9 is a perspective view of a support constituting the interior unit seen from front side.

FIG. 9 is a perspective view showing the support member constituting the interior unit seen from front side.

As shown in FIG. 9, the support member 200 has a flat plate base member 201 placed opposite to the lower side 134 (FIG. 3) of the lower cabinet 13, a plate-shaped lateral position adjuster 202 attached to the upper side of the base member 201, an inclination adjuster 203 fixed to the upper side of the lateral position adjuster 202 and inclined downward toward rear side, and a rotary position adjuster 204 opposing the upper side of the inclination adjuster 203.

The base member 201 is a plate member constituting the lower side of the interior unit 40, which is advanceable in front and back direction relative to the lower side 134 of the lower cabinet 13. The advancement and retraction of the base member 201 enables to take out the interior unit body 400 from the lower cabinet 13 in slidable manner toward the rear side.

As shown in FIG. 8, a partition 205 that extends vertically to divide the inside of the lower cabinet 13 into two spaces of right and left is formed on the right side (left side seen from rear side) of the base member 201.

Back to FIG. 9, the lateral position adjuster 202 has a plurality of track 202A elongated in right and left direction. The lateral position adjuster 202 is capable of adjusting the position thereof in right and left direction relative to the base member 201 by the track 202A. Incidentally, the lateral position adjuster 202 is screwed and fixed to the base member 201 by inserting a screw to the track 202A after the position thereof in right and left direction is adjusted.

The inclination adjuster 203 has a plate-shaped inclination adjuster body 206 and legs 207 downwardly projecting respectively from the four corners of the inclination adjuster body 206.

The legs 207 are capable of vertical advancement and retraction. The distal ends of the respective legs 207 opposite to the inclination adjuster body 207 are attached to the lateral position adjuster 202. The attitude of the inclination adjuster body 206 can be adjusted relative to the lateral position adjuster 202 by vertically advancing and retracting the four legs 207.

The rotary position adjuster 204 is rotatable in in-plane direction along the upper side of the inclination adjuster body 207 by forcing a position thereof remote from the illumination optical axis position X of a projection lens 46 approximately as a rotation center in front and back direction. The interior unit body 400 is attached to the upper side of the rotary position adjuster 204 (FIG. 8).

As described above, the attitude of the interior unit body 400 including right and left direction, inclination direction (upward shift direction) and in-plane rotation direction relative to the upper side of the base member 201 can be adjusted by the lateral position adjuster 202, the inclination adjuster 203 and the rotary position adjuster 204.

As shown in FIG. 8, the interior unit body 400 includes an approximately L-shaped optical unit 401 having a light source 411 located on the right side (left side seen from rear side) and extending from the light source 411 toward left side and further front side, and a control board 402 covering a part of the right side of the optical unit 401 and extending from the center to the left side (right side seen from rear side).

The control board 402 is a board having a controller including CPU etc., which controls the drive of the optical device constituting the optical unit 401 in accordance with the inputted image information. The surroundings of the control board 402 are covered with a metal shield 403. The shield 403 covering the control board 402 is attached to the rotary position adjuster 204 spanning over the optical unit 401 through a column-shaped member. The details of the optical unit 401 will be described below.

The first power source 301 is provided on the front side of the light source 411 and on the left side of the partition 205, which includes a first power source block 303 and a lamp driving circuit (ballast) 304 adjacent to the first power source block 303.

The first power source block 303 supplies electric power fed from the outside to the lamp driving circuit 304, the control board 402 etc. through a not-illustrated power cable connected to the inlet connector 145.

The lamp driving circuit 304 supplies electric power fed from the first power source block 303 to the light source lamp constituting the optical unit 401, which is electrically coupled with the light source lamp. The lamp driving circuit 304 is, for instance, wired to a non-illustrated board.

The first power source 301 is covered with a metal shield 305 with right and left sides being opened. The shield 305 prevents leakage of electromagnetic noise. An axial-flow fan 521 for the power source is attached to a center opening of the first power source 301, which blows cooling air in a direction for the first power source 301 to be extended, i.e. from the central portion to the right side. The shield 305 works as a duct for guiding the cooling air.

The second power source 302 is provided in a space on the right side of the partition 205, which has a second power source block 306 and a sound signal amplifier 307 for amplifying the inputted sound signal, which is covered with metal shield 308.

The second power source block 306 supplies electric power fed from the outside to the sound signal amplifier 307 through a non-illustrated power cable connected to the inlet connector 145.

The sound signal amplifier 307 is driven by the electric power supplied by the second power source block 307 to amplify the inputted sound signal, which is electrically coupled with the below-described speaker box and the woofer box (not illustrated in FIG. 8). The sound signal amplifier 307 is, for instance, wired to a non-illustrated board.

3. Structure of Optical Unit

Figure 10:
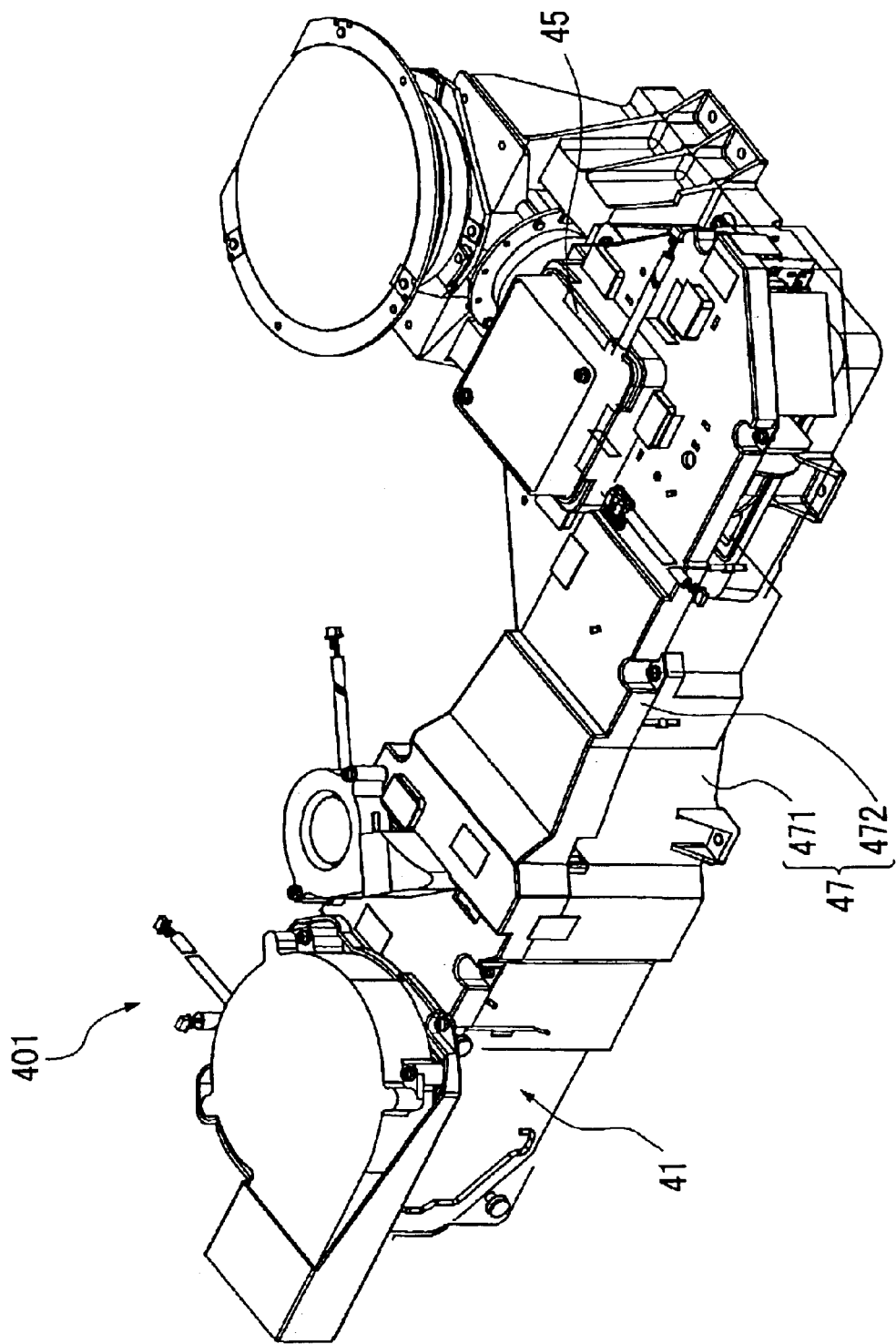
FIG. 10 is a perspective view showing an optical unit constituting the interior unit.
Figure 11:
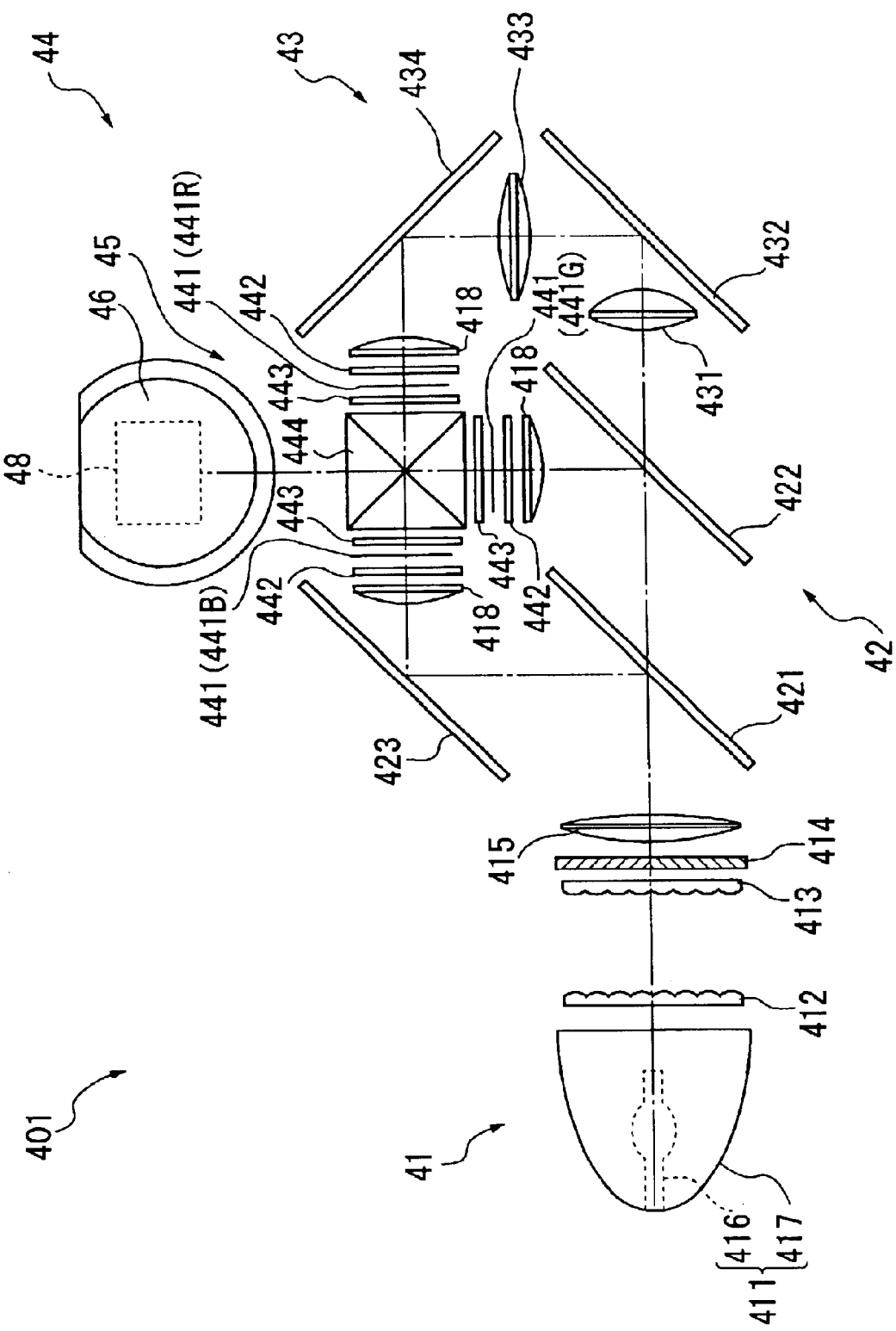
FIG. 11 is a plan view schematically showing the optical unit.

FIG. 10 is a perspective view showing the optical unit 401. FIG. 11 is a plan view schematically showing the optical unit 401.

As shown in FIG. 11, the optical unit 401 is a unit for optically processing the light beam irradiated by a light source lamp as a component of the light source to form an optical image in accordance with image information, which includes an integrator illuminating optical system 41, a color separating optical system 42, a relay optical system 43, an optical device 44, a right-angle prism 48 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the rear projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hie 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Though the red color light of the three color lights are transmitted to the relay optical system 43, other arrangement where, for instance, blue color light is transmitted thereto is possible.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross-dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Though not specifically shown, the optical device body 45 has the cross dichroic prism 444, a metal base for supporting the cross dichroic prism 444 from the lower side, a metal holding plate for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate. A predetermined gap is secured between the holding plate and the liquid crystal panel 441, so that the cooling air is flowed through the gap.

A right-angle prism 48 is located on light-irradiation side of the cross dichroic prism 444 of the optical device 44, which bends and reflects the color image combined by the cross dichroic prism 444 in a direction of the projection lens 46, i.e. bends and reflects the forwardly-irradiated color image in upward direction.

The projection lens 46 enlarges the color image reflected by the right-angle prism 48 to project on the reflection mirror 30. The projection lens 46 is supported by a support member screwed to the rotary position adjuster 204.

As shown in FIG. 8, a box-shaped cover 49A having open upper side is provided around the projection side of the projection lens 46. An opening for securing optical path of the projected optical image is formed around the upper side 133 of the lower cabinet 13. The cover 49A abuts to the surrounding of the opening through an elastic member to enclose the opening. Incidentally, an opening is formed on the lower side 15 of the upper cabinet 12 corresponding to the opening of the upper side 133 of the lower cabinet 13.

The above-described optical systems 41 to 44 and 48 are accommodated in a light guide 47 made of synthetic resin as an optical component casing shown in FIG. 10.

Though specific illustration of the inside of the light guide 47 is omitted, as shown in FIG. 10, the light guide 47 has a lower light guide 471 having the groove for the respective optical components 412 to 415, 418, 421 to 423, 431 to 434 and 442 (FIG. 11) to be slidably fitted from the above, and a lid-shaped lower light guide 472 for closing the upper opening side of the lower light guide 471.

As shown in FIG. 1, the screen unit 50 is a rectangular transmissive screen on which the optical image enlarged by the projection lens 46 of the optical unit 401 and reflected by the reflection mirror 30 is projected from the backside. The screen unit 50 has a screen 51 and a screen cover 52 for accommodating the screen 51 with the front side of the screen 51 being exposed.

The screen 51 is of four-layer construction of diffusion plate, Fresnel sheet, lenticule sheet and protection plate in an order from the side near the incident light, i.e. backside. The light beam irradiated by the projection lens and reflected by the reflection mirror is diffused by the diffusion plate and parallelized by the Fresnel sheet, which is diffused by optical beads constituting the lenticule sheet to obtain a display image.

As shown in FIG. 2, speaker boxes 70 are respectively attached to the right and left lateral sides 16 of the upper cabinet 12 as a body independent of the upper cabinet 12. The speaker box 70 is a box-shaped body working as a speaker. The front side of the speaker box 70 is substantially flush with the front side of the screen unit 50 so that the both sides are approximately parallel in vertical direction.

As shown in FIG. 1, the screen cover 52 is fixed to the upper cabinet 12 with the screen 51 being accommodated and the front side 18 of the upper cabinet 12 and the front side of the speaker box 70 being covered.

4. Structure of Inner Cooling Section (Cooling Structure)

Figure 12:
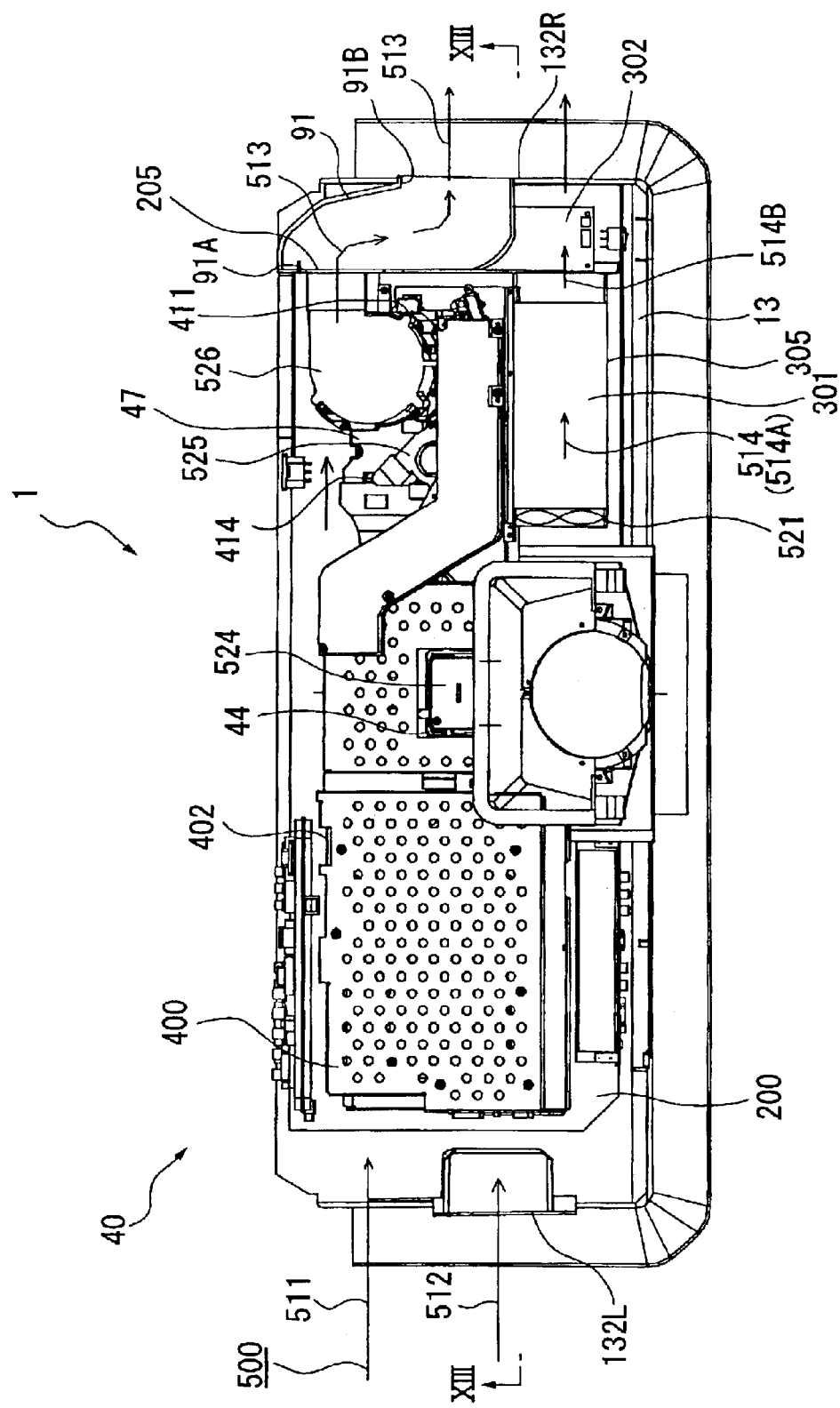
FIG. 12 is a plan view of the rear projector.
Figure 13:
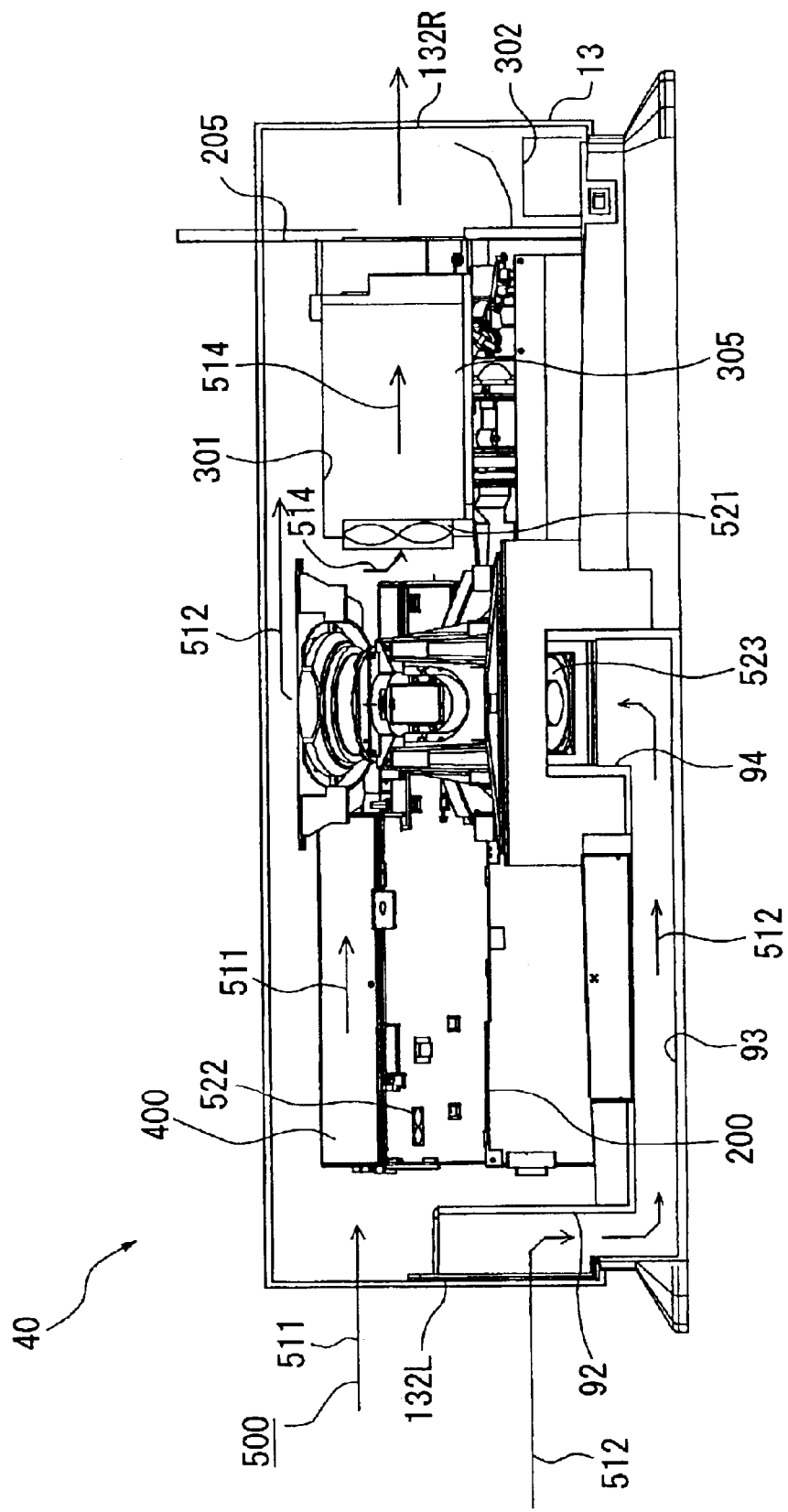
FIG. 13 is a vertical cross section taken along XIII—XIII line in FIG. 12.

FIG. 12 is a plan view showing the rear projector 1. FIG. 13 is a vertical cross section taken along XIII—XIII line in FIG. 12.

As shown in FIGS. 7, 12 and 13, the rear projector 1 is provided with an interior cooling area 500 for cooling the components 400, 200, 301 and 302 constituting the interior unit 40 and the inside of the cabinet 10. The interior cooling area 500 cools the entirety of the inside of the lower cabinet 13 including the interior unit 40.

As shown in FIGS. 12 and 13, the interior cooling area 500 introduces external cooling air from the intake opening 132L to the inside of the lower cabinet 13 to cool the respective components 400, 200, 301 and 302 inside the lower cabinet 13 and discharge the air having cooled the components from the exhaust opening 132R on the right side to the outside. In other words, a cooling channel for flowing the cooling air from the left side to the right side along the front side of the screen unit 50 is formed in the lower cabinet 13.

The interior cooling area 500 has a control board cooling channel 511, an optical device cooling channel 512, a light source cooling channel 513 and a power source cooling channel 514.

In the interior cooling area 500, as shown in FIGS. 12 and 13, a part of the external cooling air introduced from the intake opening 132L by axial-flow fans 522 and 523 is drawn in by the axial-flow fan 522 to cool the control board 402 while flowing along the control board cooling channel 511. A part of the rest of the cooling air is drawn by the axial-flow fan 523 and a sirocco fan 524 to be introduced to cool the optical device 44 through the optical device cooling channel 512 including the second to fourth ducts 92 to 94. The cooling air joins around the upper side of the optical device 44.

A first duct 91 disposed on the right side of the partition 205 extending in front and back direction is used in the light source cooling channel 513.

A part of the joined air is drawn by two sirocco fans 525 and 526 for cooling optical components as shown in FIG. 12, which flows in the light source cooling channel 513 in the light guide 47 to cool the polarization converter and the light source and subsequently flows in the first duct 91 to be discharged from the exhaust opening 132R to the outside.

On the other hand, the rest of the joined air is drawn by the axial-flow fan 521 to be introduced to the first power source 301 and the second power source 302 through the power source cooling channel 514 to cool the first power source 301 and the second power source 302, which is discharged from the exhaust opening 132R to the outside.

Two channels are provided as the exhaust channel for the air having cooled the components. The air having cooled the light source 411 is directly discharged to the outside through the dedicated first duct 91 without being in contact with the other components so as to avoid interference with the second power source 302.

5. Details of Interior Cooling Mechanism

Figure 14:
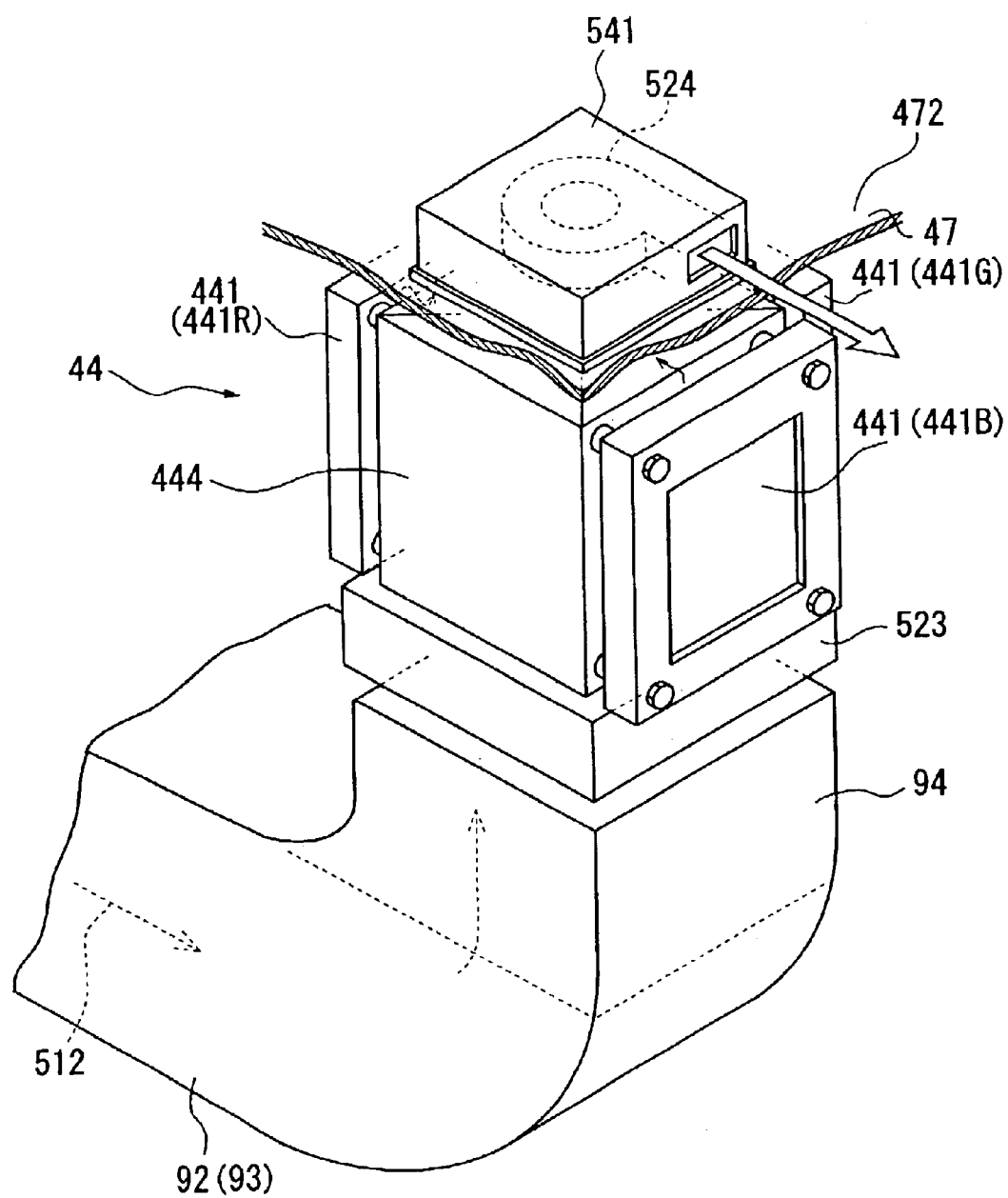
FIG. 14 is a perspective view schematically showing a neighborhood of an optical device constituting the optical unit.

Next, the interior cooling area 500 will be described below in detail with reference to FIGS. 8 and 12 to 14. FIG. 14 is a perspective view schematically showing the neighborhood of the optical device 44, which illustrates the flow of the cooling air that is introduced by the ducts 92 to 94 and is discharged out of the fourth duct 94.

As shown in FIG. 12, two channels are provided in the interior cooling area 500 for the channel of the cooling air introduced from the intake opening 132L to the inside. The interior cooling area 500 is also provided with two channels as channels of the air having cooled the components which is discharged from the exhaust opening 132R to the outside.

The two channels for introducing cooling air refer to the control board cooling channel 511 and the optical device cooling channel 512. On the other hand, the two channels for discharging the air having cooled the components refer to the light source cooling channel 513 and the power source cooling channel 514.

As shown in FIG. 14, the optical device cooling channel 512 is provided with the lower-side axial-flow fan 523 provided on the lower side of the cross dichroic prism 444 as a component of the optical device 44 disposed in the light guide 47, the fourth duct 94 located below the lower-side axial-flow fan 523, the upper-side sirocco fan 524 located above the upper light guide 472 of the light guide 47 and a fan cover 541 covering the sirocco fan 524. Incidentally, the sirocco fan 524 may be an axial-flow fan.

As shown in FIGS. 13 and 14, the external cooling air is introduced from the intake opening 132L to the neighborhood of the lower side of the optical device 44 by the lower-side axial-flow fan 523 through the ducts 92 to 94.

The cooling air introduced to the neighborhood of the lower side of the optical device 44 flows in the space between the cross dichroic prism 444 and the three liquid crystal panels 441 (441R, 441G and 441B) from the lower side to the upper side being drawn by the upper sirocco fan 524 and flows in the right direction being regulated by the fan cover 541. Accordingly, the three liquid crystal panels 441 (441R, 441G and 441B) that are easily damaged by heat are directly cooled in efficient manner.

Now as shown in FIGS. 8 and 12, the light source cooling channel 513 is provided with the small sirocco fan 525 located above the polarization converter 414 accommodated in the light guide 47, the large sirocco fan 526 located above the light source 411 and the first duct connected to the large sirocco fan 526.

As shown in FIG. 12, the small sirocco fan 525 flows through the optical device cooling channel 512 to draw in the air around the upper side of the optical device 44 and guide the air from the opening formed on the upper side of the polarization converter 414 into the light guide 47. Accordingly, the polarization converter 414 is directly cooled.

Incidentally, the sirocco fan 525 also draws in the external cold air from the second intake opening 141A formed on the rear side of the lower cabinet 13 shown in FIG. 3 to guide the cold air into the light guide 47. Accordingly, the temperature of the air circulated inside the light guide 47 can be lowered, thus efficiently cooling the inside of the light guide 47.

As shown in FIG. 12, the large sirocco fan 526 draws in the air introduced into the light guide 47 by the small sirocco fan 525 to guide the air into the first duct 91, thus mainly cooling the light source lamp 416 as a component of the light source 411.

As shown in FIG. 8, the first duct 91 is a tube-shaped resin body of approximately rectangular cross section that is used for forming the light source cooling channel. The first duct 91 is fixed to the right side of the partition 205 extending along the front and back direction as the normal line direction of the front side of the screen.

A connection hole 91A as an introduction hole to be connected with the large sirocco fan 526 is formed on a left side 91L of the tube-shaped first duct 91 around rear side, and a discharge hole 91B is formed on a right side 91R of the first duct 91 around the front end thereof.

The connection hole 91A is of approximate rectangular shape. The approximately rectangular connection hole 91A is connected with the large sirocco fan 526 sandwiching the partition 205, so that the air inside the light guide 47 drawn in by the sirocco fan 526 is introduced to the first duct 91 through the connection hole 91A. Incidentally, sealing member for preventing air leakage such as packing may be provided to the connecting portion.

The discharge hole 91B is larger than the connection hole 91A and is formed in approximately rectangular shape. The connection hole 91A is directly connected to the exhaust opening (not illustrated in FIG. 8) formed on the right lateral side of the lower cabinet.

As shown in FIG. 12, the air flowing through the control board cooling channel 511 and the optical device cooling channel 512 is drawn by the small sirocco fan 525 to cool the polarization converter 414 in the light guide 47, and is subsequently drawn in by the large sirocco fan 526 to cool the light source 411 including the light source lamp 416 in the light source cooling channel 513, which is introduced into the first duct 91 through the connection hole 91A of the first duct 91.

Subsequently, the air having cooled the components and introduced into the first duct 91 is directly discharged to the outside from the exhaust opening 132R connected to the discharge hole 91B being guided by the first duct 91.

The partition 205 of the support member 200 divides the inside of the lower cabinet 13 into two spaces of right and left, so that the first power source 301 and the light source 411 are located in a space different from the space where the second power source 302 is located. Accordingly, the heat generated by the light source 411 does not exert influence on the second power source 302. Further, since the heated air after cooling the first power source 301 does not flow to the light source 411, the light source 411 can be cooled with the air of relatively low temperature.

The power source cooling channel 514 includes a first power source cooling channel 514A for cooling the first power source 301 and a second power source cooling channel 514B for cooling the second power source 302. As described above, the first power source 301 is located on the left-side space of the partition 205 and the second power source 302 is located on the right-side space of the partition 205, the power source cooling channel 514A and 514B are divided by the partition 205 in right and left direction.

However, since a part of the partition 205 is cut, the first power source cooling channels 514A is in communication with the second power source cooling channel 514B.

Incidentally, the temperature of the air after cooling the first power source 301 is lower than the air after cooling the light source 411.

The axial-flow fan 521 attached to the first power source 301, the shield 305 surrounding the first power source block etc., and the partition 205 are provided in the power source cooling channel 514.

In the power source cooling channel 514, the air flowing through the control board cooling channel 511 and the optical device cooling channel 512 is drawn in by the axial-flow fan 521 for the power source and cools the first power source 301 being guided by the shield 305 as a duct to flow out to the right space of the partition 205. Subsequently, the air flowed out to the space on the right side flows along the partition 205 to cool the second power source 302 opposing the exhaust opening 132R and is discharged to the outside from the exhaust opening 132R.

Incidentally, though axial-flow fans are used in various sections for cooling the components, the fans may be sirocco fans. On the other hand, axial-flow fan may be used instead of sirocco fan.

6. Advantage of Embodiment (1) Since the intake opening 132L and the exhaust opening 132R are separately formed on the respective right and left lateral sides 132 of the lower cabinet 13, the air after cooling the interior components discharged from the exhaust opening 132R can be securely prevented from flowing into the intake opening 132L. Accordingly, the temperature of the air introduced from the intake opening 132L is constantly approximately the same as room temperature, thereby efficiently cooling the interior of the lower cabinet 13.

(2) Since the air after cooling the components is discharged from the right and left lateral sides 132 of the lower cabinet 13 to which the front side of the screen unit 50 is not provided, the air after cooling the components is not discharged from the front side 131 of the lower cabinet 13, thereby causing no unpleasant feeling on spectators. Further, blur of the image on the screen when the temperature of the discharged air is high can be avoided.

(3) Since the cooling air circulates in the right and left direction, unlike an arrangement where the cooling air is circulated in front and back direction, the flow of the air is not blocked even when the rear projector 1 is located with the rear side thereof facing the room wall, thereby efficiently and securely cooling the interior of the projector.

(4) Since the first duct 91 extends in front and back direction and the air after cooling the components flows in normal line direction of the screen unit 50, the air can be guided in front and back direction by the first duct 91 when it is desirable to flow the air in the front and back direction according to layout of the respective components such as the interior unit 40, so that the inside can be further efficiently cooled.

(5) Since the connection hole 91A is formed on the left lateral side 91L around the rear end thereof and the discharge hole 91B is formed on the right lateral side 91R around the front end thereof in the first duct 91, the air flowing along the front side of the screen unit 50 can be taken in by the connection hole 91A and discharged again from the discharge hole 91B in a direction along the screen surface. Accordingly, the inside of the rear projector 1 can be efficiently cooled without hindering the entire flow of the cooling channel inside the rear projector 1.

(6) Since the first duct 91 is used for forming the light source cooling channel 513 and the discharge hole 91B is directly connected to the exhaust opening 132R, the air of highest temperature after cooling the light source 411 is directly discharged from the exhaust opening 132R, the air after cooling the light source 411 can be prevented from being supplied to the other components such as the first power source 301 and the second power source 302, thereby enhancing cooling efficiency. Further, since the first duct 91 is provided, noise such as operation noise and jet noise of the large sirocco fan 526 can be reduced.

(7) Since the second power source 302 and the light source 411 are located in different spaces, the heat of the light source 411 does not influence on the second power source 302.

(8) Since the temperature of the air after cooling the first power source 301 is relatively low, the air can be utilized for cooling the sound signal amplifier and the second power source block. Accordingly, the inside of the rear projector 1 can be efficiently cooled.

(9) Since the cooling air introduced from the intake opening 132L is directly supplied to the optical device 44 by the optical device cooling channel 512, cooling efficiency of the optical device 44 can be enhanced by introducing the low-temperature cooling air to the optical device 44.

(10) Since the optical device cooling channel 512 is provided between the lower side of the lower cabinet 13 and the leg 20, the layout such as the internal unit 40 can be freely determined, thus improving the freedom of design.

(11) Since the third duct 93 can be provided only by forming a concave groove on the receiver surface 21 of the leg 20 which can be used as the optical device cooling channel 512, the internal structure of the rear projector 1 can be simplified.

(12) Since the fans 523 and 524 are located on the upper and lower side of the cross dichroic prism 444, the cooling air can be securely flowed along the incident and irradiation sides of the cross dichroic prism 444. At this time, since a predetermined gap is provided between the cross dichroic prism 444 and the liquid crystal panel 441, the incident and irradiation sides of the cross dichroic prism 444 and the backside of the liquid crystal panel 441 where heat can easily stay can be securely cooled.

(13) Since the right and left dimension of the lower cabinet 13 is smaller than the right and left dimension of the upper cabinet 12, even when the rear projector 1 is installed closely to the corner of a room etc., the wall surface and the upper cabinet 12 are in mutual contact and a space can be retained on both sides of the lower cabinet 13, so that the cooling air can be securely flowed. Accordingly, the space of a room etc. can be efficiently utilized.

7. Modification of Embodiment

Incidentally, the scope of the present invention is not restricted to the above-described embodiment, but includes other arrangement as long as an object of the present invention can be achieved, which includes following modifications.

For instance, the first duct may not be extended in front and back direction, but the first duct 91 may be extended in any desired direction such as vertical direction or oblique direction shifted relative to the front and back direction. In other words, the first duct 91 may be designed in any manner as long as the cooling air flows from one lateral side to the other lateral side in the entire rear projector 1.

Though the first duct 91 is of approximately rectangular cross section, the cross section of the first duct 91 may be designed in any shape such as circular shape and polygonal shape as long as the cooling air can efficiently flow therein. Further, the position and configuration of the connection hole 91A and the discharge hole 91B of the first duct 91 are also not limited. In such case, the position and configuration may be designed in any manner in accordance with the layout inside the rear projector 1 and the component to be cooled.

Though only the light source 411 is selectively cooled using the first duct 91, the other component other than the light source 411 such as the power sources 301 and 302 may be selectively cooled. However, since the light source 411 generates the most heat in the rear projector 1, the arrangement of the embodiment is preferable in that the cooling efficiency in the rear projector 1 can be improved.

Though the optical device is selectively cooled using the second to the fourth ducts 92 to 94 in the above embodiment, the component other than the optical device 44 may be selectively cooled.

Though the cooling air is introduced from the left side and discharged from the right side seen from front direction, the cooling air may flow in reverse manner.

Though the two channels as the introduction channel of the cooling air and two discharge channels as the exhaust channel are provided in the embodiment, such arrangement is not limiting but it is enough to provided at least one introduction channel and discharge channel. In other words, any arrangement is possible as long as the cooling air flows along the front side of the screen unit 50 in the entire projector.

Though the screen is of rectangular shape in the above embodiment, the screen may be formed in trapezoid or other shape other than tetragon, which may be determined in accordance with the design of the rear projector 1.

What is claimed is:

1. A rear projector, comprising:
   an image generator having an optical device that modulates a light beam irradiated by a light source in accordance with image information to form an optical image and a projection optical system that enlarges and projects the optical image;
   a box-shaped casing that accommodates the image generator;
   a screen exposed on any one of sides of the box-shaped casing that on which the optical image formed by the image generator is projected;
   an intake opening that introduces a cooling air to the image generator is formed on a first lateral side of the casing adjacent to a first edge of the screen other than the side provided with the screen;
   an exhaust opening that discharges the air after cooling the image generator is formed on a second lateral side of the casing adjacent to a second edge of the screen opposite to the first edge of the screen; and
   a cooling channel for the cooling air to be flowed is formed inside the casing along the surface of the screen.

2. The rear projector according to claim 1, further comprising a first duct that guides at least a part of the cooling air in normal line direction of the surface of the screen is provided in the cooling channel.

3. The rear projector according to claim 2, the first duct including a tube-shaped body having an introduction hole that introduces at least a part of the cooling air at a side adjacent to a first end thereof and a discharge hole for discharging the introduced cooling air at a side adjacent to a second end opposite to the first end.

4. The rear projector according to claim 2, the first duct forming a channel for cooling the light source and being directly connected to the exhaust opening.

5. The rear projector according to claim 4,
   the image generator having a first power source block that supplies electric power to a controller that controls the drive of the optical device, a sound signal amplifier that amplifies a sound signal annexed to the image information and a second power source block that supplies electric power to the sound signal amplifier, and
   a partition that divides a cooling channel of the first power source block from a cooling channel of the sound signal amplifier and the second power source block being provided in the cooling channel.

6. The rear projector according to claim 5, further comprising:

a fan that cools the first power source block is provided adjacent to the first power source block; and a fan that cools the light source is provided adjacent to the light source, the fans sharing the cooling air introduced from the intake opening to form two cooling channels.

7. The rear projector according to claim 1, the casing having a first casing that accommodates the image generator and a second casing provided with the screen, and the dimension of the first casing along the screen surface being smaller than the dimension of the second casing along the screen surface.

8. The rear projector according to claim 1, the intake opening having at least two intake systems that introduce the cooling air into the interior of the casing, and the exhaust opening having at least two exhaust systems that discharge the air after cooling the interior of the casing.

9. The rear projector according to claim 8, further comprising a dust filter provided at least in one of the intake systems.

10. The rear projector according to claim 1, further comprising:

a leg provided on the lower side of the casing that supports a body of the projector;

a second duct that introduces a part of the cooling air to the lower side of the projector is provided to the opening; and an optical device cooling channel connected to the second duct to guide the cooling air to the optical device is formed on the lower side of the casing and the leg.

11. The rear projector according to claim 1, the screen being formed in a rectangle.

* * * * *